United States Patent [19]
Pastore

[11] Patent Number: 6,071,483
[45] Date of Patent: Jun. 6, 2000

[54] REACTOR VESSEL AND PROCESS FOR PREPARING A CONTROLLED-DOSAGE CHLORINE DIOXIDE SOLUTION

[76] Inventor: Mauro Pastore, Via Dante, 17/10, 20068 Peschiera Borromeo, Italy

[21] Appl. No.: 08/903,044

[22] Filed: Jul. 29, 1997

[30] Foreign Application Priority Data

Aug. 2, 1996 [IT] Italy .................................. MI96A1702
Dec. 6, 1996 [IT] Italy .................................. MI96U0806

[51] Int. Cl.⁷ .................................................. B01D 11/04
[52] U.S. Cl. ........................... 422/255; 422/37; 422/256; 422/261; 422/266; 423/477
[58] Field of Search .................... 422/120, 122, 422/37, 256, 255, 261, 266; 423/477

[56] References Cited

U.S. PATENT DOCUMENTS

| | | | |
|---|---|---|---|
| 4,013,761 | 3/1977 | Ward et al. .............................. | 423/477 |
| 4,247,531 | 1/1981 | Hicks ...................................... | 423/477 |
| 4,597,941 | 7/1986 | Bottom et al. ........................... | 422/37 |
| 4,709,423 | 12/1987 | Richards ................................. | 4/228 |
| 5,091,107 | 2/1992 | Hutchings ............................ | 252/187.21 |
| 5,156,823 | 10/1992 | Hori et al. .............................. | 422/292 |
| 5,618,440 | 4/1997 | Mason ..................................... | 210/716 |

FOREIGN PATENT DOCUMENTS 2 155 459  9/1985  United Kingdom.

*Primary Examiner*—Krisanne Thornton
*Attorney, Agent, or Firm*—Guido Modiano; Albert Josif; Daniel O'Byrne

[57] ABSTRACT

A reactor vessel and an associated process for preparing a controlled-dosage chlorine dioxide solution. The vessel according to the invention comprises a hollow body inside which there are provided two chambers which have different volumes, each chamber having, in an upper region, an opening which is closed by a removable plug and the chambers are mutually connected by a substantially horizontal duct with openings located in a region which is spaced upward with respect to the bottom of the two cited chambers. The vessel according to the present invention is particularly suitable for preparing a disinfectant and highly pure chlorine dioxide solution, minimizing the risk of developing noxious gases.

15 Claims, 2 Drawing Sheets

REACTOR VESSEL AND PROCESS FOR PREPARING A CONTROLLED-DOSAGE CHLORINE DIOXIDE SOLUTION

BACKGROUND OF THE INVENTION

The present invention relates to a reactor vessel and to a process for preparing a controlled-dosage chlorine dioxide solution.

In particular, the present invention relates to a reactor vessel for household or hospital use and to the corresponding process for the on-site preparation, dosage and correction of chlorine dioxide solutions which have a high-level sanitizing and disinfecting action.

Containers are known, particularly in the field of detergents and disinfectants, which allow to dose the liquid contained therein before using them.

In particular, containers are known which are formed monolithically and have a body in which two chambers are provided which have mutually different volumes: the smaller-volume chamber, meant to be used to measure the liquid to be dispensed, usually has graduations and is placed at a higher level than the larger-volume chamber, which contains the liquid to be dosed. The smaller-volume chamber is furthermore connected to the larger-volume chamber by means of a duct which usually runs vertically and has an inlet arranged proximate to the bottom of the larger-volume chamber and an outlet arranged in a region which is spaced upward from the bottom of the smaller-volume chamber.

In practice, these containers have a single dispensing opening, which is closed by a removable plug and is located in the smaller-volume chamber in order to allow to dispense the product after dosage thereof, which is carried out in the smaller-volume chamber.

With these containers, the liquid to be dosed is placed in the larger-volume chamber and the user, by compressing the container in the region occupied by the larger-volume chamber, causes the intended amount of product to rise from the larger-volume chamber to the smaller-volume chamber until the intended level of product is reached inside the smaller-volume chamber, using the graduations provided in said chamber as a reference.

Precision of the dosage of the product inside the smaller-volume chamber depends on the skill and attention of the user.

Moreover, this kind of containers cannot be used as reactors for preparing controlled-dosage solutions of substances that can release vapors during reaction if said vapors might be noxious or irritant, because the contact between the two substances that must react together occurs in the smaller-volume chamber and this entails removing or in any case loosening the plug that closes the smaller-volume chamber in order to allow the transfer of the substance located in the larger-volume chamber to the smaller-volume chamber.

It is also known that chlorine dioxide is prepared industrially and exclusively in the form of an aqueous solution and that its main use is to render water potable or to disinfect swimming pools or polluted water.

Industrial preparation is performed by feeding a solution of sodium hypochlorite or acid, by means of a pump, into a reactor into which a sodium chlorite solution is fed by means of another pump. Starting from the time of contact, and also thereafter, due to the continuous inflow of the reagents, dioxide gas develops continuously and is fed continuously into a water stream the flow rate whereof is proportional to the amounts of the reagents used to obtain the intended concentration in the water. Chlorine dioxide is highly unstable and this explains why despite being a low-toxicity sterilizing disinfectant it is not commercially available as a concentrated solution to be diluted at the time of use.

In order to obviate instability, attempts have been made to prepare the chlorine dioxide solution at the place of use.

Construction and management of a sufficiently economical small system for obtaining small amounts of chlorine dioxide at the point of use, for example those required to disinfect a private dwelling or a hospital or the sanitary services of a community, have never occurred because the system is expensive owing to the use of safety-type vacuum or pumping devices.

Moreover, their use cannot be entrusted to unskilled persons, as occurs in a household environment, or to people who are rotated continuously, as occurs in a cleaning contractor charged with disinfecting a hospital environment.

It would be indispensable to have devices to avoid the formation of pockets of gas with a concentration of more than 10% by volume (approximately 300 g/m$^3$), since the gas is unstable and can decompose violently.

Current systems are furthermore bulky and operate continuously in order to introduce dioxide into streams of running water.

Once dissolved in water, the dioxide is not stable for more than two or three days, and then the concentration which continuously decreases does not allow to perform the necessary controlled dosages: this fact prevents the production of the dioxide in a suitable plant, as well as its storage and commercialization.

The above facts explain the need and convenience of setting up the problem in a new way and of bringing the preparation of dioxide to the point of use by means of a mini-reactor and of a safe and simplified method for producing a highly pure solution.

Attempts to produce highly concentrated solutions of chlorine dioxide in pure form have led to the production of solutions with a concentration of $ClO_2$ no higher than 93% and with rather low purity, owing to the presence of contaminants which are mainly constituted by partially unreacted reagents and intermediates.

Canadian patent no. 959,239 in the name of Callerame discloses a conventional process for producing chlorine dioxide by reacting an alkaline metal or an alkaline-earth metal such as sodium chlorite and an acid. The composition obtained as a result of the acidification of the sodium chlorite does not have the sought disinfectant effectiveness, especially in terms of germicidal rate. In order to compensate for this shortcoming, it is necessary to resort to the use of a high concentration of sodium chlorite and acid, which can lead to toxicity problems, particularly when the composition is used in an enclosed space. The composition obtained by the interaction of sodium chlorite and acid furthermore does not produce an effective solvent environment for products that contain active chlorine, such as chlorine dioxide, chlorous acid and the like.

Inhaling these components can be noxious.

Accordingly, these toxicity problems have forced various limits to the general use of the disinfectant composition.

U.S. Pat. No. 4,084,747 in the name of Alliger discloses a composition which comprises a water-soluble chlorite, such as sodium chlorite, with a solution of lactic acid. This composition has improved disinfectant properties with respect to others that use an acid other than lactic acid, but it is necessary to heat the solution to 50° C. in order to achieve a good disinfectant action.

This limitation, however, entails the drawback that it does not allow practical use of the solution and does not allow to control the formation rate of chlorous acid and therefore to control the chlorine dioxide.

More recently, patent WO 85/04107 in the name of Alcide Corporation discloses a synergistic disinfectant composition which comprises a compound capable of releasing dioxide, an organic acid other than lactic acid, and a polyhydroxylated compound. The use of this composition, however, is mainly aimed at preparing products in gel form for disinfecting human mucous membranes, with particular reference to use in toothpastes.

Even more recently, patent EP 0 581 550 in the name of Yosef was published, claiming a composition which is suitable to release $ClO_2$ in water; the composition comprises a water-soluble chlorite salt, a proton donor agent, and a chlorine donor agent which act as an oxidizing agent, such as Na/K-DCC, which is suitable to activate the reaction.

It is thus evident that the methods of the prior art entail drawbacks linked to the difficulty of adjusting the development of chlorine dioxide and to the possibility of producing it in amounts suitable for household use in a pure form which is stable and effective from the point of view of germicidal activity. Moreover, most conventional processes do not allow to limit the development of dioxide vapors, which are inherently toxic and certainly irritant for the upper respiratory tract even when inhaled in rather diluted amounts.

Finally, it is noted that the use of certain components (for example Na-DCC, chlorinated derivatives, solvents, etcetera) in the reaction mixtures can be an additional factor which entails a high toxicological and allergologic risk in use, owing to the formation of secondary compounds caused by the chlorinating action of chlorine.

SUMMARY OF THE INVENTION

The aim of the present invention is to avoid or substantially reduce the above-identified drawbacks.

An object of the present invention is to provide a vessel which can be used as a reactor and/or dosage device and/or correction device and which, when used as a reactor, does not cause emission of toxic, noxious or irritant substances and when used as a dosage device allows to perform extremely precise dosage of the product regardless of the skill of the user.

Another object of the invention is to provide a reaction vessel which is compact and very simple and easy to use to prepare at the point of use a controlled-dosage chlorine dioxide solution at competitive costs.

Another object of the present invention is to provide a reaction vessel for producing, at the non-industrial level, a disinfectant solution based on $ClO_2$, during the preparation and/or correct use whereof the development of $ClO_2$ vapors in the environment outside the reaction is particularly limited.

Another object is to provide a method for producing a solution based on chlorine dioxide whose production does not entail the use of continuous or industrial production systems.

Another object is to provide a method for producing at the point of use a variable-concentration chlorine dioxide disinfectant solution which is accurate and practical to use in the household and professionally.

According to a first aspect of the present invention, a reactor vessel is provided for preparing a controlled-dosage chlorine dioxide solution, characterized in that it comprises a hollow body which forms two chambers having different volumes, each of which has, in an upward region, an opening which is closed by a removable plug, said chambers being mutually connected by a substantially horizontal duct with openings arranged in a region which is spaced upward from the bottom of said chambers.

According to another aspect of the present invention, a process is provided for preparing a controlled-dosage chlorine dioxide solution which provides for:

the use of a reactor vessel described above.

According to this aspect of the invention, a process is advantageously provided for preparing a controlled-dosage chlorine dioxide solution which comprises the steps of:

reacting a water-soluble compound capable of releasing chlorine dioxide and a soluble proton donor in solution (in the liquid phase) in a dosage chamber of a reactor vessel until the chlorine dioxide vapors that develop from the reaction are dispersed in a diluent liquid which is present in a dilution chamber of the reactor vessel, which is connected to said dosage chamber by a substantially horizontal duct with openings arranged in a region which is spaced upward from the bottom of said chambers.

The solution produced in the dosage chamber is not extremely pure, since it contains chlorite residues, but the dioxide vapors that are trapped and dissolve in the dilution liquid lead to a highly pure solution.

According to an embodiment of the process according to the invention, there is a subsequent step which comprises:

mixing the concentrated solution that is present in the dosage chamber with the diluent liquid that is present in the dilution chamber, providing a chlorine dioxide solution which is ready for use.

During the reaction step, the reagents are supplied in the form of an aqueous solution or in the form of powders to which water is added.

During the preparation of the controlled-dosage solution, the reactor vessel provides a reaction environment which is isolated from the outside environment.

The diluent liquid is demineralized water or an acid aqueous solution, advantageously of the buffered type, in order to maintain a pH between 2.5 and 7. Said acid aqueous solution preferably includes inorganic acids, more preferably in an amount between 0.1 and 3% by weight.

The compound capable of releasing chlorine dioxide according to the present method is a compound which releases chlorine dioxide when placed in contact in the liquid phase with a proton donor. Among these compounds, water-soluble chlorites are preferred because they are easily available and inexpensive. Typical water-soluble chlorites include chlorites of alkaline and alkaline-earth metals and mixtures thereof, sodium chlorite and potassium chlorite being particularly preferred. Sodium chlorite is the most preferred. In the execution of the process according to the invention, the compound capable of releasing chlorine dioxide is present in an amount between 5 and 50% by weight in the reaction chamber of the reactor vessel.

The proton donor that can be used in the method according to the invention is an acid of the organic or inorganic type, which in the reaction step of the process according to the invention is present in an amount between 0.5 and 10% by weight, more preferably between 1 and 3% by weight.

Among organic acids, preference is given to those chosen from the group that consists of citric acid, tartaric acid, malic acid, oxalic acid, salicylic acid, lactic acid, tannic acid, fumaric acid, succinic acid, sorbic acid, benzoic acid, formic acid and mixtures thereof, whilst among inorganic acids, preference is given to those chosen from the group that consists of hydrochloric acid, sulfamic acid, sulfuric acid and acid salts thereof, such as salts of sodium and magnesium disulfate, sodium and magnesium pyrosulfate, potassium disulfate, potassium pyrosulfate and mixtures thereof.

The proton donor and the compound capable of releasing chlorine dioxide (reagents) are advantageously supplied in the form of solutions having a preset concentration, to be mixed in the dosage chamber of the reactor vessel according to the invention, or in the form of powders to be dissolved at the time of use in a liquid placed in the dosage chamber.

The reagents can also be supplied as a single mix in powder form in microencapsulated form.

The water-based liquid that can be used in the present invention is demineralized water or an aqueous solution that contains acids and/or pH-regulating agents, so as to maintain pH values advantageously between 2 and 7.

In the initial reaction step, a solution of highly concentrated chlorine dioxide forms in the smaller-volume reaction chamber, producing irritant vapors.

In order to avoid the known problems of mucous membrane irritation, the $ClO_2$ vapors are then continuously diffused in a water-based diluent liquid provided in a second containment means which is isolated from the outside environment.

An advantageous dispersion of the $ClO_2$ gas in the liquids contained in the two chambers of the reactor vessel occurs in a time interval between 3 minutes and 48 hours, more preferably between 10 minutes and 24 hours. During this step, since the $ClO_2$ vapors cannot develop in the outside environment because they are contained within the vessel, they are dispersed mostly into the diluent liquid, producing a pale yellow diluted solution.

The resulting diluted solution is substantially free from pollutants, such as chlorites and metals, and can be used per se in the disinfection of sanitary devices or of equipment in the food industry.

In particular, since it has been observed that a chlorine dioxide solution placed in contact for one hour with a vehicle contaminated with spores of Bacillus subtilis produced a 99.99% decrease in the spores, such a solution can be advantageously applied to the sterilization of at-risk hospital equipment, such as hemodialysis instruments, surgical instruments and instruments for internal use.

An optional subsequent mixing of the two solutions produced as a result of the execution of the two steps of the process according to the invention provides for a uniform chlorine dioxide solution with a degree of purity which is slightly lower than that obtained by performing only the initial step of the process.

The resulting dioxide solution can be diluted further and used in the disinfection of the most disparate environments, such as households, hospitals and outpatient facilities.

When the vessel is opened at the end of the reaction, which is normally completed in 24 hours, 10 cm above the opening no presence of dioxide gas was detected, since it was below the detectability level of 0.1 ppm and thus within the acceptability limits set by the applicable statutory provisions.

Further verifications as to the extent of the development of $ClO_2$ gas were performed by placing, 24 hours after the beginning of the reaction between the chlorite and the acid, an aspirator nozzle 10 cm away from the opening; the nozzle being connected to a conventional gas detector means according to the Drager method.

For household use or for civil use, provisions have been made to use a reactor vessel with a capacity of 1 to 30 liters, provided with two separate compartments, each of which is connected to the outside by means of a mouth provided with a plug. The domestic user is thus allowed to directly produce an appropriately diluted chlorine dioxide solution by means of a method which is simple to perform, with no danger of being exposed to toxic vapors.

The method according to the present invention furthermore has the advantage that it can also be used by operators who do not have a high level of professional qualification, such as hospital attendants and cleaning and disinfection staff.

One application relates to the production of diluted solutions of $ClO_2$ in amounts which are sufficient for use in the disinfection of large environment surfaces.

According to an embodiment of the present invention, an aqueous solution of proton-donor acids which also has detergent sequestrant characteristics, constituted by citric acid, tartaric acid and a limited dose of inorganic acids, as described hereafter, is prepared first.

BRIEF DESCRIPTION OF THE DRAWINGS

Further characteristics and advantages will become apparent from the detailed description of the reactor vessel according to the invention, illustrated only by way of non-limitative example in the accompanying drawings, wherein.

DESCRIPTION OF THE PREFERRED EMBODIMENTS

Figure 1:
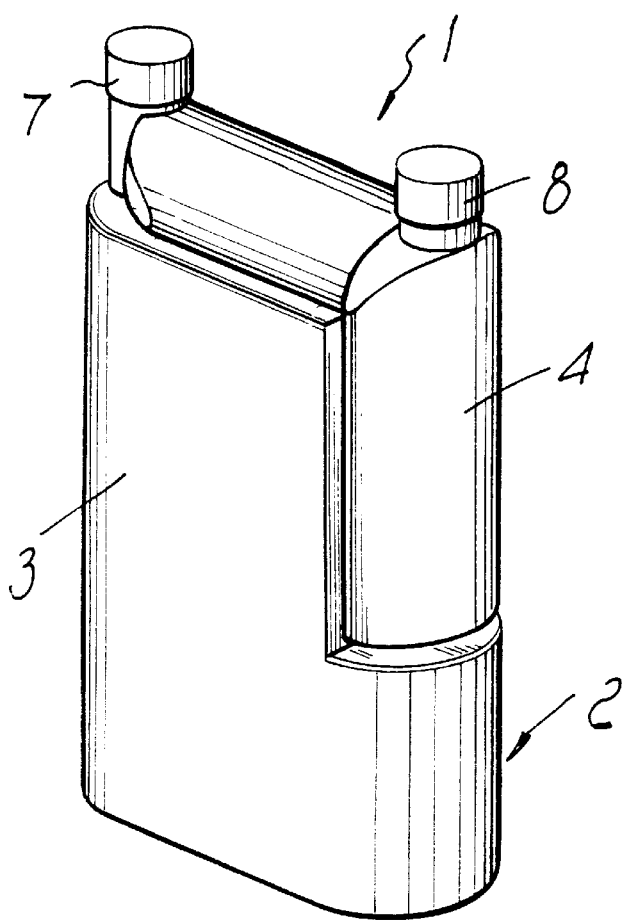
FIG. 1 is a perspective view of the vessel having the structure according to the invention.
Figure 3:
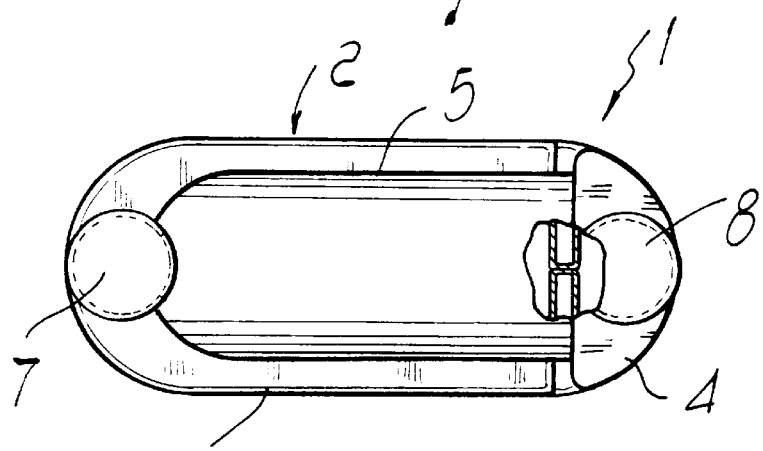
FIG. 3 is a top plan view of the vessel.
Figure 2:
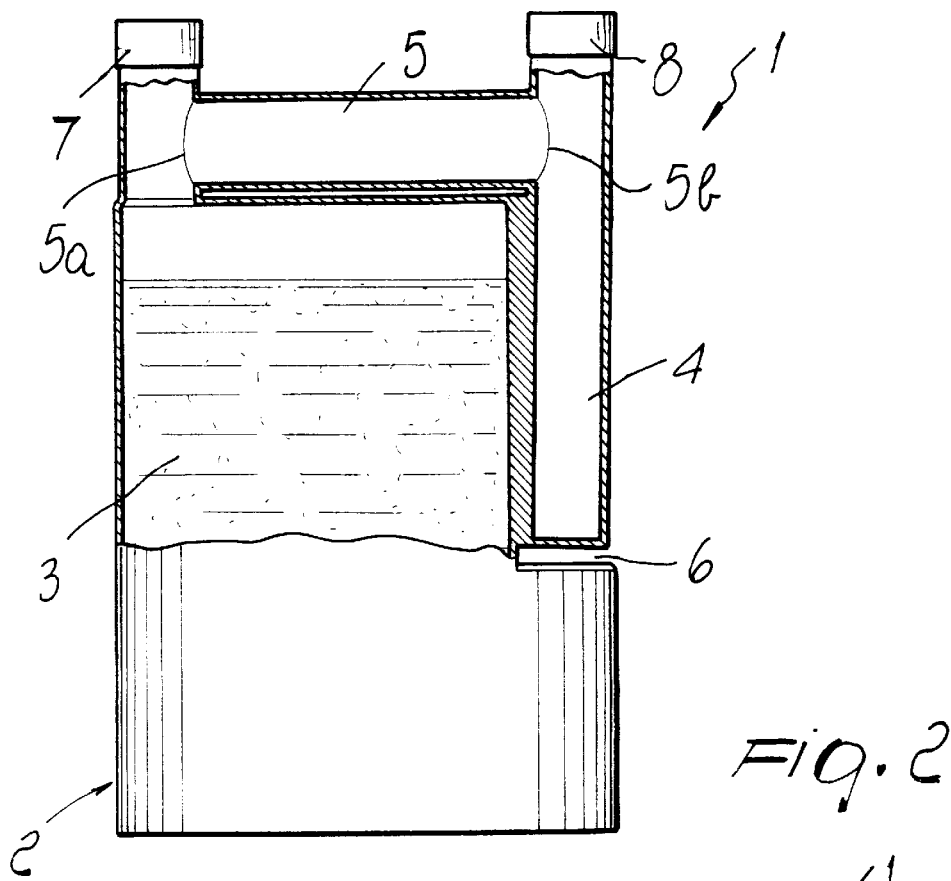
FIG. 2 is a partially sectional front elevation view of the vessel according to the invention.
Figure 4:
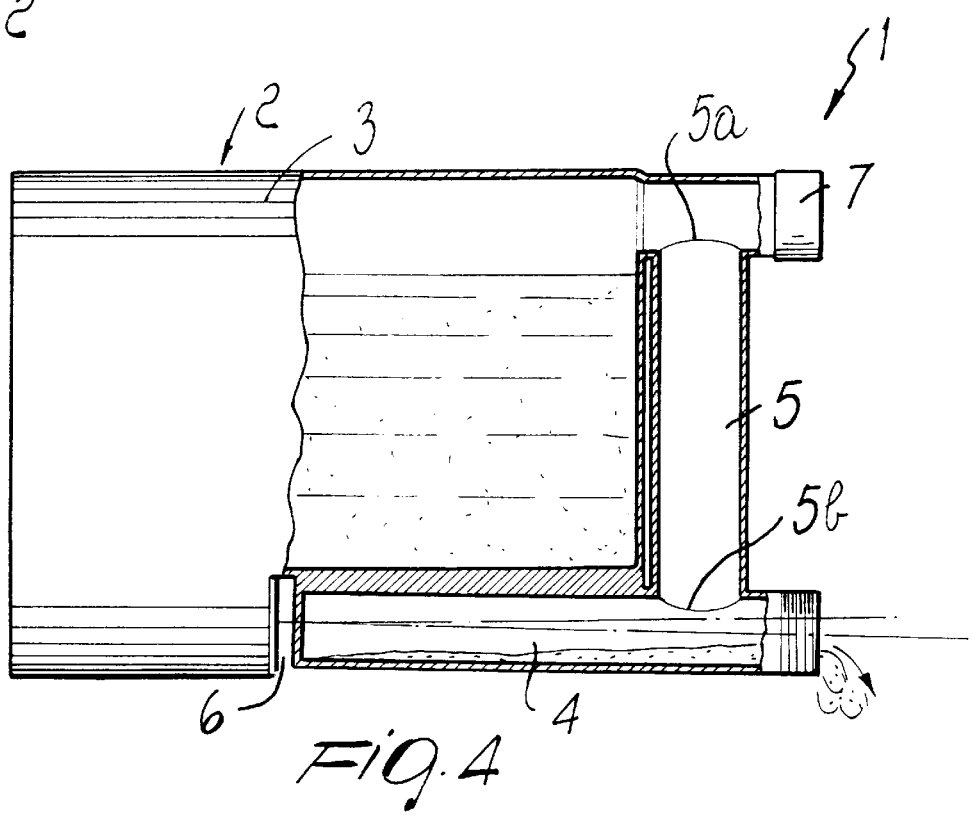
FIG. 4 is a view of a step of use of the reactor vessel.

With reference to the above figures, the reactor vessel according to the invention, generally designated by the reference numeral 1, is substantially constituted by a hollow body 2 which is preferably formed monolithically by molding synthetic material (thermoplastic resin) and inside which there are two chambers: respectively, a first chamber 3 which has a larger volume and a second chamber 4 or dosage chamber which has a smaller volume than the chamber 3.

According to the invention, the two chambers 3 and 4 are mutually connected by means of a duct 5 which lies substantially horizontally and has openings 5a and 5b arranged in regions which are spaced upward from the bottom of the chambers 3 and 4.

More particularly, the body 2 preferably has a substantially cylindrical configuration with a rectangular base, in which the two smaller sides are curved and radiused with the two larger sides.

The chamber 3 has, in a lateral upper region, a recess 6 which is formed for example by means of a pinching of the synthetic material during the molding of the body 2 and at which the chamber 4 is provided, which is thus separated from the chamber 3 and is connected thereto only by means of the duct 5.

The first chamber 3 and the second chamber 4 are connected to the outside by means of openings which are formed at their upper end and are closed by removable plugs 7 and 8, preferably screw plugs.

The two openings closed by the plugs 7 and 8 have axes which lie on a median plane of the body 2 which is parallel to the larger sides of the bases of the body 2. Said median plane also contains the axis of the duct 5 and is a plane of symmetry for the body 2.

Preferably, the duct 5 is substantially cylindrical and its openings 5a and 5b, which are connected respectively to the chamber 3 and to the chamber 4, are formed directly below the openings closed by the removable plugs 7 and 8.

The duct 5 is furthermore preferably dimensioned so that its volume is at least equal to the volume of the second chamber 4.

Advantageously, the second chamber 4 lies along an axis which is slightly inclined laterally outward, at least proximate to the opening closed by the plug 8, with respect to the median axis of the vessel so as to facilitate the transfer of the dosed liquid into the second chamber 4.

Use of the reactor vessel having the structure according to the invention is as follows.

If the vessel is meant to be used as a reactor, for example to prepare a controlled-dosage chlorine dioxide solution, an aqueous solution, possibly constituted simply by water or by a buffered acid solution, is introduced in the first chamber 3.

A water-soluble compound, capable of releasing chlorine dioxide, and a water-soluble proton donor are instead introduced in the second chamber 4.

It should be noted that both of these compounds can be in powder form, optionally of the microencapsulated kind, or preferably in the form of an aqueous solution.

If the two compounds are already in the liquid form, they react together immediately; if instead they are in powder form, the vessel according to the invention is tilted and then returned to the upright position so as to introduce in the second chamber 4 the required amount of the aqueous solution contained in the first chamber 3.

As a consequence of this fact, a chemical reaction occurs inside the second chamber 4 which releases chlorine dioxide vapors, which diffuse through the duct 5 in the aqueous solution contained in the chamber 3.

After a preset time, such as to allow the complete reaction of the substances inside the second chamber 4, the vessel is turned upside down so as to fully mix the product contained in the second chamber 4 with the aqueous solution contained in the first chamber 3.

In this manner a controlled-dosage chlorine dioxide solution is obtained, which is ready for use.

It should be noted that the reaction that produces the controlled-dosage chlorine dioxide solution, with the vessel according to the invention, occurs whilst the plugs 7 and 8 are fully closed; therefore the vapors produced during the reaction inside the second chamber 4 are assuredly prevented from diffusing into the surrounding environment.

If it is necessary to perform a further dilution of the solution in order to use the controlled-dosage chlorine dioxide solution, it is possible to turn the container upside down every time and then return it to the upright position, so as to fill the second chamber 4 in order to obtain a very precise volume of solution inside the chamber 4; said volume is then delivered by removing the plug 8.

It should be noted that the dosage of the product inside the chamber 4 is very precise, since by turning the vessel upside down and then returning it to the upright position the second chamber 4 always fills exactly up to the lower rim of the opening 5b, without air bubbles preventing correct dosage, since the duct 5, in addition to acting as a connecting duct, by virtue of the fact that its volume is at least equal to the volume of the second chamber 4, also acts as a reservoir capable of topping up the liquid contained in the second chamber 4 until it reaches the level of the lower edge of the opening 5b, whilst the vessel is returned to the upright position.

When using the vessel as a correction device, use is similar to what has been described above, except that the correcting substance is first introduced in the second chamber 4 and is then mixed with the substance contained in the first chamber 3 at the time of use by turning the vessel upside down.

During use as a dosage device, the substance to be dosed is introduced in the first chamber 3 and is dosed by turning the vessel upside down; and then returning said vessel to the upright position so as to fill the second chamber 4 up to the lower rim of the opening 5b of the duct 5.

In practice, it has been observed that the vessel having the structure according to the invention has fully achieved the intended aim and objects, since it can be used as a reactor in preparing substances which require the mixing of at least two components without causing any external emission during the mixing of the components. During use as a dosage device, the vessel according to the invention ensures high dosage precision without requiring particular attention or skill on the part of the user.

Although the vessel according to the invention has been conceived in particular to prepare a controlled-dosage chlorine dioxide solution, it can in any case be used advantageously to prepare other substances, particularly in preparing substances which can produce noxious, toxic or irritant emissions or for the dosage of other disinfectants.

Use of the described vessel allows simple and practical preparation of chlorine dioxide according to various methods included within the scope of the present invention, such as those described in detail hereinafter merely by way of example.

EXAMPLE 1

The process according to the invention was performed by using the above-described reactor vessel and by following the operating method described in detail hereafter:

1) 970 ml of demineralized water or buffered solution are introduced in a dilution chamber referenced by the letter A and the plug is closed.
2) The two pre-dosed and separate solutions of acids and chlorite are introduced in a smaller-volume reaction chamber, referenced by the letter B, and then the plug of B is also closed immediately.

Reaction at room temperature is allowed to occur for 1 to 15 hours in order to allow the chlorine dioxide vapors that develop from chamber A, which contains the concentrated chlorine dioxide solution, to disperse in the water-based diluent liquid contained in chamber B, which has a closed opening, without mixing the two liquids; the bottle is turned upside down several times in order to mix A and B, and the resulting dioxide is used; the ready-for-use solution is preserved for approximately 14 days.

Container B, which has a useful capacity of 20–100 ml, also acts as a dosage device.

EXAMPLE 2

The following operating steps A or A', B and C were performed in order to prepare a concentrated chlorine dioxide solution:

A) adding a water-soluble compound capable of releasing chlorine dioxide and a water-soluble proton donor agent, at least one of which is in the form of an aqueous solution, in a first containment means and, if appropriate, adding a water-based liquid to said first containment means; or, as an alternative, A') adding a water-soluble compound capable of releasing chlorine dioxide and a water-soluble proton donor agent, at least one of which is in the form of an aqueous solution, to a water-based liquid placed in a first containment means; and then B) allowing the chlorine dioxide vapors that develop from said first containment means that contains the concentrated chlorine dioxide solution to disperse in a water-based diluent liquid which is present in a second containment means which has a closed opening, without mixing the two liquids;

C) mixing the concentrated chlorine dioxide solution which is present in the first containment means with the water-based diluent liquid which is present in the second containment means, so as to obtain a diluted solution which is ready for use.

Advantageously, the method according to the present invention allows to produce a $ClO_2$ solution which can be dosed and is stable for 14 days if the sample is kept in a refrigerator.

To further exemplify this characteristic, a solution of $ClO_2$ according to the present invention was prepared which had a concentration of 305 ppm of $ClO_2$. This solution, over 23 days, lost only 9% of its activity, since it decreased to 275 ppm at the end of the period.

EXAMPLE 3

950 ml of demineralized water were poured into the 1000 ml dilution chamber of a reactor vessel according to the invention. A first single-dose 38 ml bag containing a solution of the following amounts: 12 g citric acid, 8 g tartaric acid, demineralized water q.s. to 38 ml and a second single-dose 12 ml bag containing a 15.5% solution of sodium chlorite were poured into the 50 ml reaction chamber.

Both chambers were closed and the system was left to react for 15 hours, from 6 pm to 9 am of the next morning.

The container was then turned upside down several times so as to facilitate transfer from A to B and mixing of the contents of both chambers.

The solution was analyzed, finding 260 ppm of chlorine dioxide and other compounds produced by the reaction of the chlorite or residues, i.e., Na Cl $O_2$ and $Cl_2$.

The pH of the solution was 2.45 when undiluted; when diluted 1:50, it was 4.95; when diluted 1:100, it was 6.05; when diluted 1:200, it was 6.45. This solution was stored in a refrigerator at 4° C. for 14 days.

A 1:200 dilution, placed in contact with viral forms which are representative of various groups of viruses (enveloped, non-enveloped, with DNA and with RNA), namely Vaccinia virus, herpes virus type 2, polio virus type 1, Sindbis virus, for 5 minutes produced a reduction of 99.999% with respect to controls. Measurements conducted according to European standards demonstrated that even in the presence of 1%, 3% and 5% calf serum, a 99.99% inactivation of the tested viruses is maintained. The same dilution also achieved a 99.999% reduction of the following bacterial strains: *Pseudomonas aeruginosa*, Salmonella spp, *Mycobacterium avium, Staphylococcus aureus*. A 1:100 dilution achieved a 99.99% reduction of *Candida albicans* yeasts and of *Aspergillus niger* fungi.

A 1:50 dilution, corresponding to 5 ppm of dioxide, with a pH of 4.5, during a contact time of less than 60 minutes, at room temperature, achieved a 99.999% reduction of a suspension of *B. subtilis* spores.

Ten dosage tests according to this example were repeated, checking the amount of solution present each time in the reaction chamber. The following values, expressed in ml, were obtained: 50.05; 49.95; 50.15; 50.05; 49.95; 49.95; 49.85; 50.15; 49.95; 50.05. Deviation from the average value was therefore limited to 0.15, clearly demonstrating the precision in the dosage of the $ClO_2$ solution allowed by the vessel according to the invention.

The preparation according to example 4 was used to disinfect all the hard and plastic surfaces of hospital and community environments.

EXAMPLE 4

The procedures described in Example 3 were repeated, except that a solution (1000 ml) of citric acid (0.7% by weight) and tartaric acid (0.3% by weight) was poured into the dilution chamber; at the end of the reaction, which lasted 15 hours, the aqueous solutions contained in the reaction and dilution chambers were not mixed and the contents of the reaction chamber were kept separate, without adding it to the solution contained in the dilution chamber.

The contents of the reaction chamber were collected and treated with a 3% solution of $FeCl_2$ and NaOH, obtaining a non-polluting precipitate.

The dilution chamber therefore contained only the dioxide gases developed in the reaction chamber, which passed through the duct connecting the two chambers and were dissolved in the water contained in A.

170 ppm of highly pure dioxide, which accordingly did not include the by-products of the acids-chlorite reaction, were found in the water of the reaction chamber.

This solution is preferably used, after diluting it appropriately, to treat the surface of food and the human skin.

EXAMPLE 5

The procedure was the same as in Example 3, except that the time of contact between the single-dose acid solution and the chlorite-containing solution was 60 minutes.

230 ppm were obtained.

The above-mentioned microbiological tests were repeated with this solution, stored in a refrigerator at 4–5 degrees C for 14 days, and repetition of the bactericidal, virucidal and sporicidal effectiveness was demonstrated.

EXAMPLE 6

The procedure was the same as in Example 3, except that a solution of acid containing 12 g of citric acid, 8 g of tartaric acid, 3 ml of 30% hydrochloric acid and the 15.5% sodium chlorite solution were fed into the small container B.

After 1 hour of contact, the two solutions were mixed and the dioxide content was analyzed and found equal to 290 ppm.

The pH of the mix as such was 2.1; diluted 1:50, it was 4.8; diluted 1:100, it was 6.2; diluted 1:200, it was 6.5.

EXAMPLE 7

The preparation is the same as in Example 3, except that a solution of 2% sodium lauryl sulfate surfactants and fragrance co-formulants was fed into the dilution chamber.

Mixing was performed after 60 minutes and 230 ppm were found. A 1:50 dilution of the product obtained according to Example 1 had a pH of 6.5.

This preparation is used to treat surfaces where one wishes to add fragrances or surfactants.

EXAMPLE 8

The disinfectant activity of the chlorine dioxide solution, prepared by using the process according to the invention, was verified.

Disinfectant activity was checked on spores of *Bacillus subtilis*, placing a suspension of 2,500,000 spores/ml in contact with three chlorine dioxide solutions at variable concentrations for increasingly longer contact times.

The results are listed in the following table:

| Contact time (minutes) | UFC | Virucidal concentration % | | |
|---|---|---|---|---|
| | | 2 | 4 | 8 |
| 0 | 2.5*10$^6$ | | | |
| 10 | | 12 | 0 | 0 |
| 30 | | 2 | 0 | 0 |
| 60 | | 0 | 0 | 0 |

Full lethality for the spores occurred in less than 10 minutes at 4% concentration, i.e., at 10 ppm, whilst a concentration of 2%, i.e. 5 ppm, is sufficient if 60 minutes are available: both solutions can be easily rinsed at these concentrations.

The smell of the solution at 5–10 ppm was not found to be unpleasant. The tested solutions were furthermore found to be non-corrosive for the metals on which they are applied, so that the solution was found suitable for the disinfection of surgical instruments and medical equipment.

What is claimed is:

1. A process for preparing a highly pure controlled-dosage chlorine dioxide solution, comprising:

reacting a water-soluble compound capable of releasing chlorine dioxide and a soluble proton donor agent in a liquid phase in a dosage chamber of a reactor vessel until the chlorine dioxide vapors that develop from the reaction are dispersed in a diluent liquid which is present in a dilution chamber of the reactor vessel, which is connected to said dosage chamber by a substantially horizontal duct with openings arranged in a region which is spaced upward from the bottom of said chambers, by providing a first chlorine dioxide solution.

2. A process according to claim 1, comprising an additional step of:

mixing a concentrated solution that is present in the dosage chamber with the diluent liquid that is present in the dilution chamber, providing a chlorine dioxide solution which is ready for use.

3. A process according to claim 1, wherein at least one of said compound capable of releasing chlorine dioxide and said proton donor agent is provided in the form of an aqueous solution.

4. A process according to claim 1, wherein the reaction and mixing steps are performed in a reaction environment which is isolated from the outside environment.

5. A process according to claim 1, wherein said water-soluble compound capable of releasing chlorine dioxide is a salt of a metal chosen from the group that consists of alkaline metals, alkaline-earth metals and mixtures thereof.

6. A process according to claim 5, wherein said salt is sodium chlorite.

7. A process according to claim 1, wherein said water-soluble proton donor agent is an acid chosen from the group that consists of tartaric acid, citric acid, malic acid, oxalic acid, lactic acid, fumaric acid, succinic acid, salicylic acid, tannic acid, sorbic acid, benzoic acid, formic acid, sulfamic acid, sulfuric acid, hydrochloric acid and mixtures thereof.

8. A process according to claim 1, wherein reagents are supplied in pre-dosed amounts.

9. A process according to claim 1, wherein said compound capable of releasing chlorine dioxide is in the form of an aqueous solution which has a concentration between 5 and 50% by weight.

10. A process according to claim 1, wherein the step of reaction and dispersion of the chlorine dioxide vapors occurs over a period between 10 minutes and 24 hours.

11. A reactor vessel for preparing a controlled-dosage chlorine dioxide solution, comprising a hollow body which defines two chambers having different volumes, each of the chambers having, in an upward region, an opening which is closed by a removable plug, said chambers being mutually connected by a substantially horizontal duct provided with openings arranged in a region which is spaced upward from a bottom of said chambers, wherein said duct has a volume which is at least equal to the volume of said second chamber.

12. A reactor vessel for preparing a controlled-dosage chlorine dioxide solution, comprising a hollow body which defines two chambers having different volumes, each of the chambers having, in an upward region, an opening which is closed by a removable plug, said chambers being mutually connected by a substantially horizontal duct provided with openings arranged in a region which is spaced upward from a bottom of said chambers, wherein said first chamber has, in an upper region, a recess at which said second dosage chamber is defined.

13. A reactor vessel for preparing a controlled-dosage chlorine dioxide solution, comprising a hollow body which defines two chambers having different volumes, each of the chambers having, in an upward region, an opening which is closed by a removable plug, said chambers being mutually connected by a substantially horizontal duct provided with openings arranged in a region which is spaced upward from a bottom of said chambers, wherein said body has a cylindrical shape with a rectangular base in which the two smaller sides are curved and radiused with the two larger sides.

14. A reactor vessel for preparing a controlled-dosage chlorine dioxide solution, comprising a hollow body which defines two chambers having different volumes, each of the chambers having, in an upward region, an opening which is closed by a removable plug, said chambers being mutually connected by a substantially horizontal duct provided with openings arranged in a region which is spaced upward from a bottom of said chambers, and wherein said two openings have axes lying in a median plane of said body which is parallel to larger sides of said body.

15. The reactor vessel according to claim 14, wherein said body is symmetrical with respect to said median plane.

* * * * *